United States Patent
Freitas

(10) Patent No.: US 6,377,412 B1
(45) Date of Patent: Apr. 23, 2002

(54) METHOD AND APPARATUS FOR IMPROVING BASELINE RECOVERY OF AN MR HEAD USING A PROGRAMMABLE RECOVERY TIME CONSTANT

(75) Inventor: David A. Freitas, Morgan Hill, CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/435,746

(22) Filed: Nov. 8, 1999

Related U.S. Application Data

(62) Division of application No. 08/626,886, filed on Apr. 3, 1996, now Pat. No. 6,038,090.

(51) Int. Cl.⁷ .................................................. G11B 5/09
(52) U.S. Cl. .......................................... 360/46; 360/65
(58) Field of Search .............................. 360/46, 51, 65, 360/66; 375/229, 231, 232; 327/72, 34, 362, 363, 561, 303, 307

(56) References Cited

U.S. PATENT DOCUMENTS

| | | |
|---|---|---|
| 3,979,775 A | 9/1976 | Schwarz |
| 4,093,965 A * | 6/1978 | Gish .......................... 360/65 |
| 4,712,144 A | 12/1987 | Klaassen |
| 4,786,993 A | 11/1988 | Jove et al. |
| 4,914,398 A | 4/1990 | Jove et al. |
| 5,057,785 A | 10/1991 | Chung et al. |
| 5,301,080 A | 4/1994 | Ottesen et al. |
| 5,309,294 A | 5/1994 | Cahalan |
| 5,309,295 A | 5/1994 | Bailey et al. |
| 5,309,298 A | 5/1994 | Klaasen et al. |
| 5,357,150 A | 10/1994 | Jaquette |
| 5,367,411 A | 11/1994 | Nishiyama et al. |
| 5,424,883 A | 6/1995 | Koren |
| 5,455,717 A | 10/1995 | Van Doom et al. |
| 5,469,305 A | 11/1995 | Madsen et al. |
| 5,701,314 A * | 12/1997 | Armstrong et al. ........ 371/40.3 |
| 5,943,177 A * | 8/1999 | Mathews et al. ............. 360/65 |

* cited by examiner

*Primary Examiner*—Regina Y. Neal
*Assistant Examiner*—Son H. Nguyen
(74) *Attorney, Agent, or Firm*—Altera Law Group, LLC

(57) ABSTRACT

A method and apparatus for improving baseline recovery of an MR head using a programmable AC coupling pole. The location of the pole may be adjusted to achieve the fastest recovery from a baseline shift without degrading the normal channel performance. Further, the pole may be moved during the data recovery procedure to recover from a data read error. The programmable AC coupling pole includes a circuit path carrying digital data signals read from a recording media by a magnetic head, an amplifier coupled to the circuit path for amplifying the digital data signals, and a recovery time setting device having an programmable recovery time constant associated therewith. Once a data read error has been detected by the system, the recovery time constant may be adjusted to set a recovery time for the amplifier to provide readable data signals. In addition, a digital controller may be coupled to the recovery time setting device for adjusting the recovery time setting device to change the recovery time constants in response to disturbances to the magnetic head. The programmable AC coupling pole may be disposed at the output of the magnetic head preamplifier or it may be before the data channel amplifier.

35 Claims, 5 Drawing Sheets

METHOD AND APPARATUS FOR IMPROVING BASELINE RECOVERY OF AN MR HEAD USING A PROGRAMMABLE RECOVERY TIME CONSTANT

This application is a divisional of application Ser. No. 08/626,886, filed Apr. 3, 1996 now U.S. Pat. No. 6,038,090. The application is incorporated herein by reference.

BACKGROUND OF THE INVENTION

1. Field of the Invention

This invention relates in general to a method and apparatus for optimizing the recovery time for a magnetic head, and more particularly, to a method and apparatus for improving baseline recovery of an magneto-resistive (MR) head using a programmable AC coupling pole

2. Description of Related Art

A magneto-resistive head has been conventionally used for reproducing data from a magnetic recording medium. The magneto-resistive element makes use of its physical property wherein the electrical resistance of the magneto-resistive element is changed in response to a sensed intensity of a magnetic field. Thus, the magneto-resistive head may obtain the intensity of the magnetic field from a magnetic recording medium by detecting the change of the electrical resistance.

As mentioned above, a magneto-resistive (MR) transducing head exhibits a change in resistance when in the presence of a changing magnetic field. This resistance change is transformed into a voltage signal by passing a constant current through the MR element. The value of DC voltage, for a given head, is the product of the constant bias current and the total resistance between the head lead terminals.

However, the prior art reproduction of the recorded data with use of the MR element has the disadvantage that the reproduced waveform by the MR element involves non-linear distortion as the change of the resistance of the MR element to the flowing magnet device is properly non-linear as described above. For example, thermal asperities can locally increase the strip temperature by more than 100 degrees centigrade which may cause a resistance change and consequently a voltage change. Further, thermal fluctuations may produce a resistance change in the elements by passing bias current through them. Accordingly, when a thermal asperity is encountered the operating point of the MR element gets shifted and the data that is being modulated by the head will be unreadable without sufficient error correction processes.

Electronically, this change in the operating point of the MR element causes a baseline shift in the read-back signal. The circuits which are used to amplify the MR head signal will attempt to recover from the baseline shift in order to provide a readable signal. While the circuits are recovering, the data in many cases is not readable and must be recovered by error correction codes or a hard error will occur. The most likely cause of a hard error during a baseline shift is from the amplifiers saturating or from the distortion when the amplifiers are near saturation. To reduce the recovery time from an operating point disturbance and reduce the time the read back signal is saturated in the amplifier, faster recovery time constants can be chosen in the amplifier electronics. The pole that sets the recovery time constant is known as the AC coupling frequency pole of the amplifier or the high pass frequency pole of the amplifier. In the MR pre-amplifier, it can be known as the baseline restore bandwidth.

The problem with setting the AC coupling pole too high is that with the higher pole, data reading problems can occur from too much phase shift and amplitude reduction at the low frequency data patterns.

It can be seen that there is a need for an adjustable AC coupling pole for optimizing the recovery time of a magnetic head.

SUMMARY OF THE INVENTION

To overcome the limitations in the prior art described above, and to overcome other limitations that will become apparent upon reading and understanding the present specification, the present invention discloses a method and apparatus for improving baseline recovery of an MR head using a programmable AC coupling pole.

The present invention solves the above-described problems by providing a pole with a location that can be chosen for each data band on a file to achieve the fastest recovery from a baseline shift without degrading the normal channel performance. Further, the low frequency pole may be moved during the data recovery procedure to recover from a data read error.

A system in accordance with the principles of the present invention includes a circuit path carrying digital data signals read from a recording media by a magnetic head, an amplifier coupled to the circuit path for amplifying the digital data signals, and a recovery time setting means having an programmable recovery time constant associated therewith. Once a data read error has been detected by the system, the recovery time constant may be adjusted to set a recovery time for the amplifier to provide readable data signals representing the digital data signals read by the magnetic head. In addition, the invention includes a digital controller which is coupled to the recovery time setting means for adjusting the recovery time setting means to change the recovery time constants in response to compensate for the disturbance to the magnetic head.

One aspect of the present invention is that an operational transconductance amplifier having an adjustable gain is coupled to the preamplifier and wherein the gain is selected to set a recovery time for the preamplifier.

Another aspect of the present invention is that the recovery time setting means may be disposed at the output of a magnetic head preamplifier.

Another aspect of the present invention is that the recovery time setting means is a programmable RC filter wherein a resistor value is programmable to set a recovery time for the data channel amplifier.

Yet another aspect of the present invention is that the logic interface is a digital-to-analog converter.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for improving baseline recovery of an MR head using a programmable AC coupling pole. A programmable AC coupling pole is included prior to the stages of amplification which saturate during a disturbance to the MR head operating point. The programmable AC coupling pole allows the drive to select the fastest recovery from a baseline shift without degrading the normal channel performance.

Figures 1, 2:
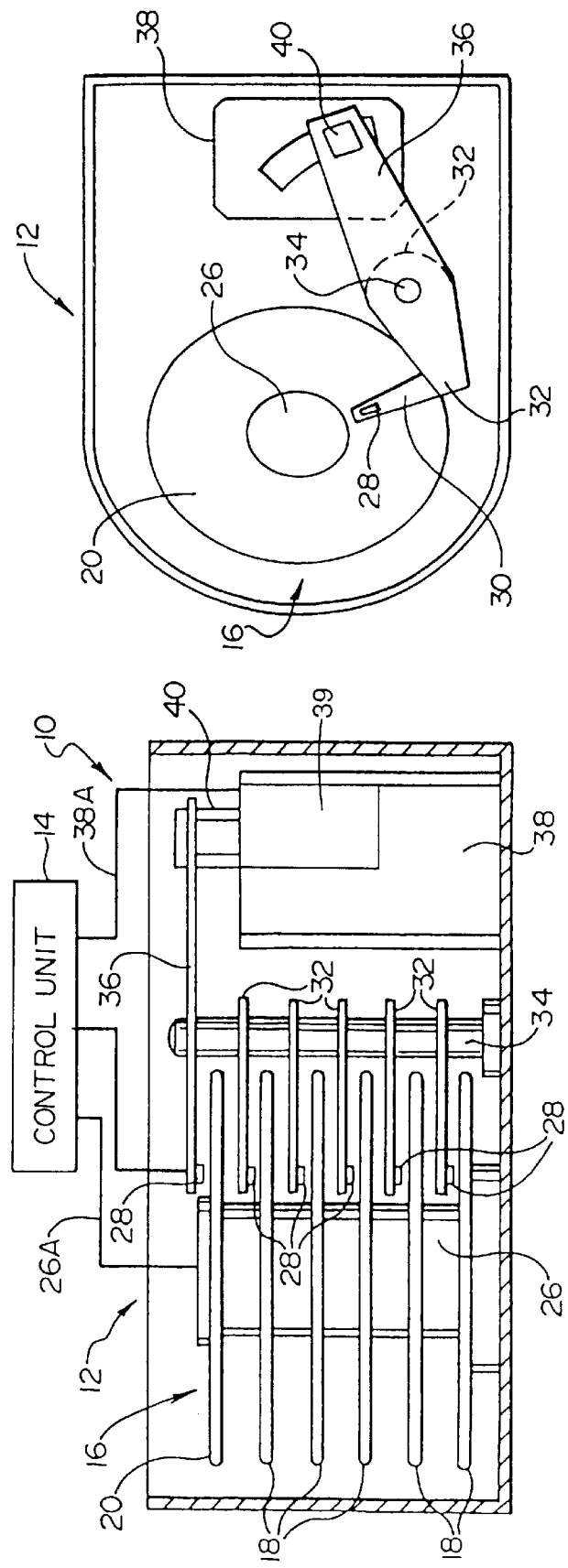
FIG. 1 is a side view of an exemplary disk drive system according to the present invention.
FIG. 2 is a top view of an exemplary disk drive system according to the present invention.

FIG. 1 illustrates an exemplary disk drive system 10 according to the present invention. In FIG. 1 there is shown a partly schematic block diagram of parts of a data storage disk file 10 including a data storage medium generally designated as 12 and an interface control unit or processor generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor (VCM) cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied.

During operation of the disk file 10, the rotation of the disks 18 generates an air bearing between the heads 28 and the disk surfaces 20. This air bearing thus counterbalances the slight spring force of the suspensions 30 and supports the transducer heads 28 off the disk surfaces during normal operation.

The various components of the disk file 10 are controlled in operation by signals generated by control unit 14 such as motor control signals on line 26A and position control signals on line 38A.

In accordance with the feature of the present invention, thermal asperity compensation is an integrated function of a partial-response maximum-likelihood (PRML) recording channel 40 available in the disk file 10.

Figure 3:
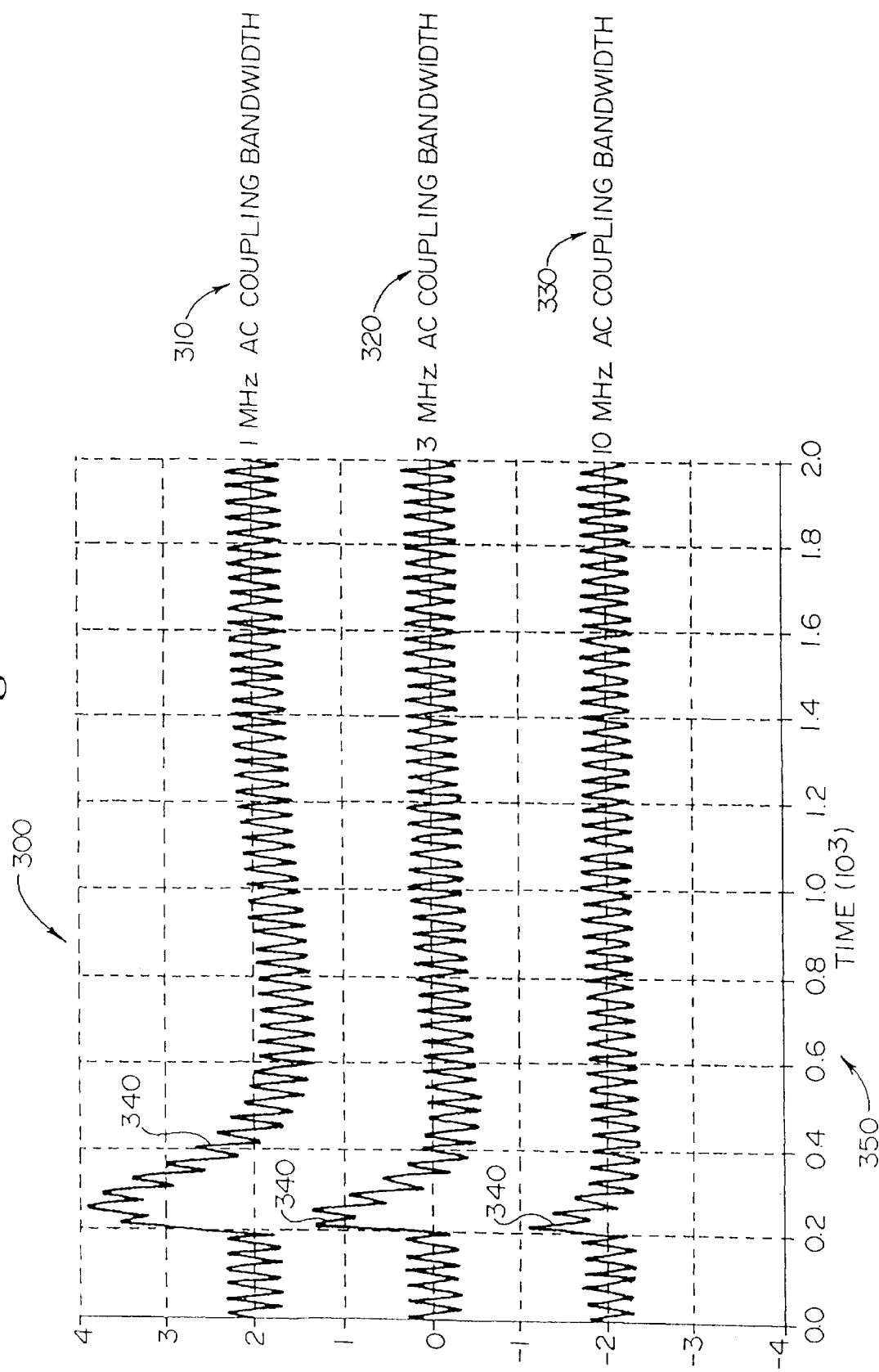
FIG. 3 illustrates a plot of the magnitude of the disturbance versus time at three different AC coupling bandwidths.

FIG. 3 illustrates a plot of the magnitude of the disturbance versus time 300 at three different AC coupling bandwidths. The top plot is an AC coupling bandwidth of one megahertz 310. The middle plot is an AC coupling bandwidth of three megahertz 320. The bottom plot is the AC coupling bandwidth of ten megahertz 330. The disturbance 340 is illustrated occurring at a time of 0.2 microseconds 350. Such a disturbance 340 to the operating point of the MR head can be so large that it prevents proper reading of the data causing a hard error. The magnitude of the disturbance 340 in the plot for the one megahertz AC coupling bandwidth 310 has the greatest magnitude and slowest recovery time. As the bandwidth is increased, the magnitude of the disturbance is minimized and the recovery time is much shorter. Accordingly, a much higher AC coupling pole during the disturbance would actually reduce the recovery time to a minimum.

Figure 4:
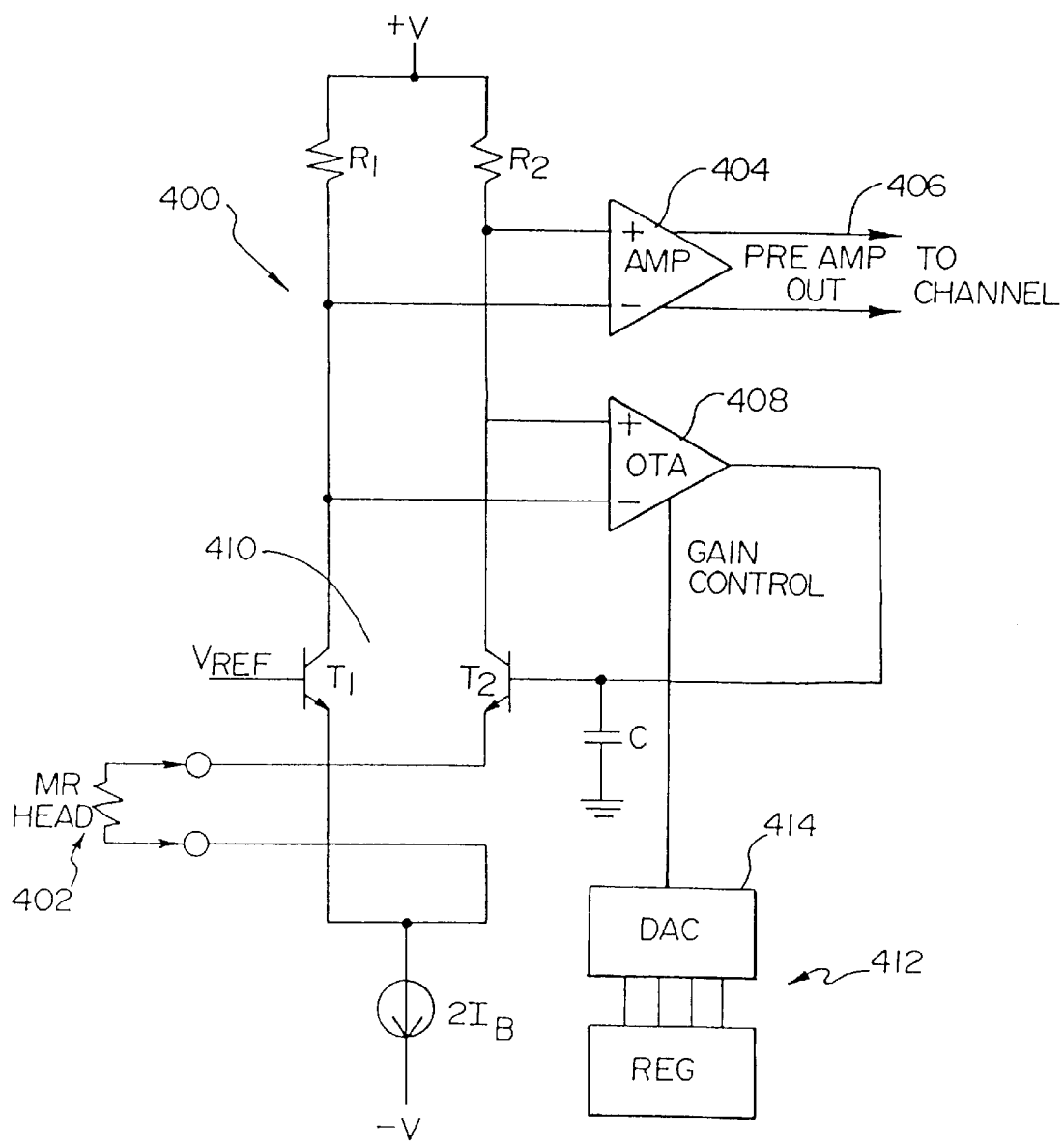
FIG. 4 illustrates the programmable AC coupling pole in the baseline restore loop in the MR preamplifier.
Figure 5:
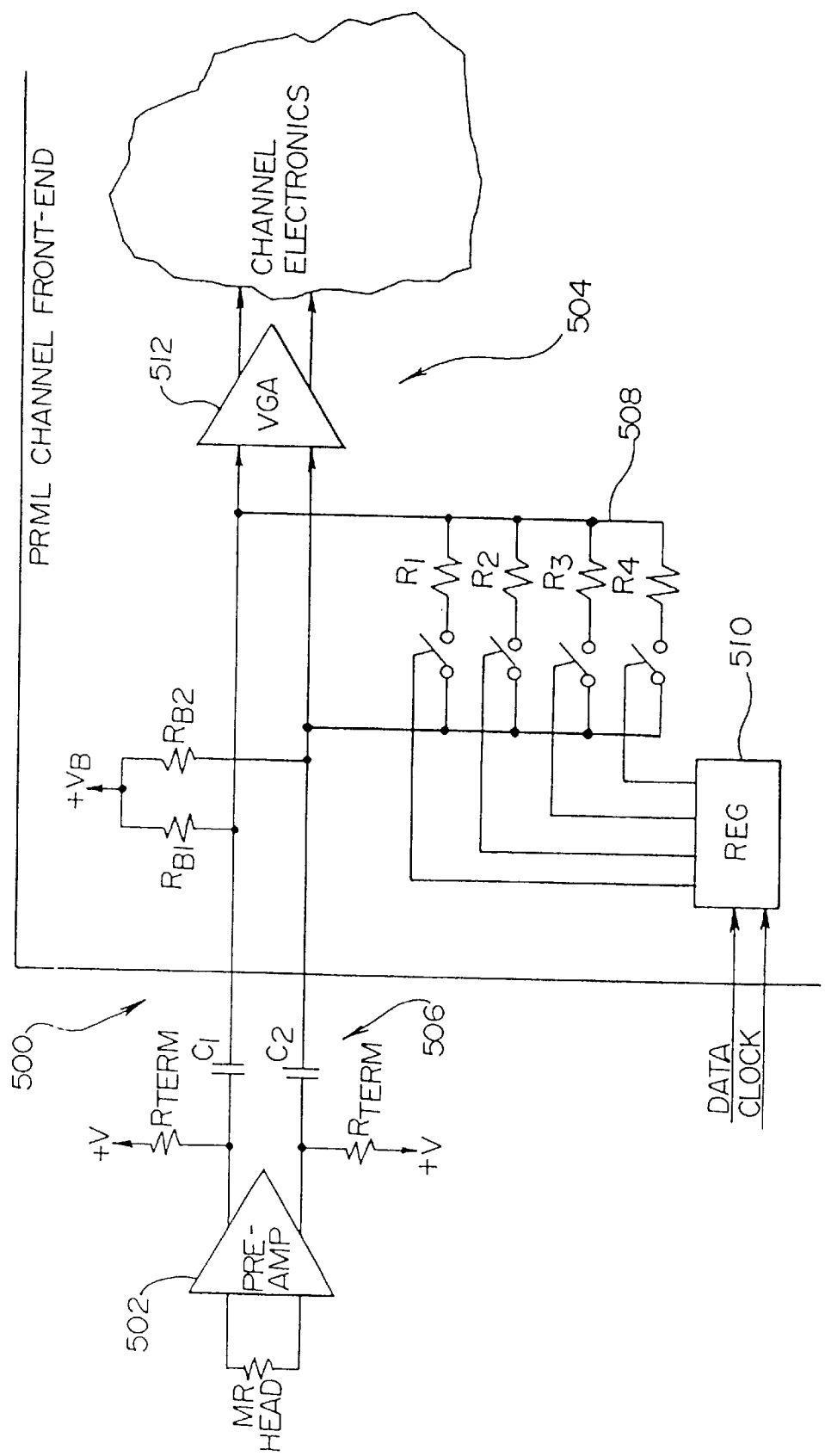
FIG. 5 illustrates the programmable AC coupling pole inserted between the MR pre-amplifier and the data channel module.

FIGS. 4 and 5 illustrate circuit diagrams for the programmable AC coupling pole according to the invention. The location of the programmable AC coupling pole can be inserted in two places: in the baseline restore loop in the MR preamplifier, or the in the AC coupling network between the MR preamplifier and the data channel module.

FIG. 4 illustrates the programmable AC coupling pole in the baseline restore loop in the MR preamplifier 400. The MR head 402 senses data from the recording media. Preamplifier 404 senses the voltage across the MR head and provides a preamplifier signal 406 to the data channel. An operational transconductance amplifier 408 also monitors the voltage across the MR head 402 and provides an input signal to the differential amplifier 410. To make the time constant of the baseline restore loop in the MR preamplifier 400 programmable, the restore loop gain must be made adjustable through a logic interface 412 (which receives signals from the file interface processor 14 illustrated in FIG. 1) in the MR preamplifier 400. The digital-to-analog converter 414 sets the gain to the operational transconductance amplifier 408. An increase in the gain to the restore loop provided by the operational transconductance amplifier 408 lowers the time constant thereby reducing the recovery time.

FIG. 5 illustrates the programmable AC coupling pole 500 inserted between the MR pre-amplifier 502 and the data channel module 504. Since the signal from the MR preamplifier 502 is differential, two AC coupling capacitors 506 are provided to each leg of the signal path between the data channel module 504 and the MR pre-amplifier 502. The resistance across each capacitor 506 sets the pole 500. In the typical configuration, the resistor that dominates the location of the pole 500 is a larger resistor 508 on the channel side of the AC coupling capacitor 506. Typically, this resistor is internal to the data channel module 504. This resistance 508 can be made programmable through a digital interface 510 to the interface processor (not shown). In most disk drives electronics, the digital interface 510 (which receives control signals from the interface processor 14 illustrated in FIG. 1)

already exists for setting the programmable parameters in the data channel.

The digital interface 510 may be coupled to an array of resistors 508 of varying resistance. The digital interface 510 selects the appropriate resistor which in turn sets the time constant for the RC circuit formed by capacitors 506 and resistor array 508. The selection of smaller resistance from the array 508 lowers the time constant and therefore decreases the recovery time for the data channel amplifier 512, which may be a variable gain amplifier.

Figure 6:
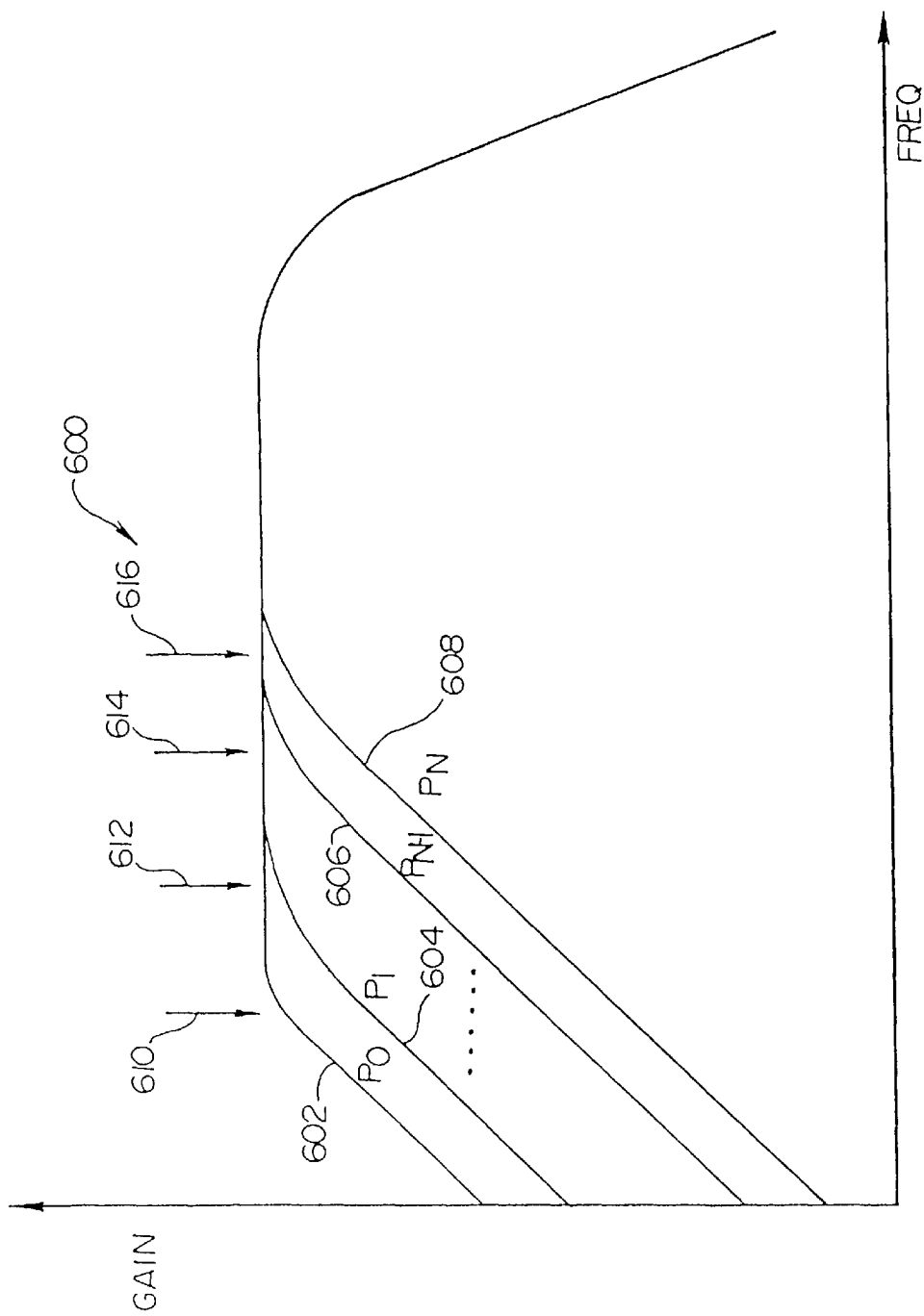
FIG. 6 illustrates a plot of the gain for an amplifier versus frequency.

FIG. 6 illustrates a plot of the gain for an amplifier versus frequency 600. Plots $P_0$ 602, $P_1$ 604, $P_{n-1}$ 606, and $P_n$ 608 illustrate the adjustment of the high pass frequency pole or low frequency pole according to the invention. To reduce the recovery time from an operating point disturbance in the MR head, the AC coupling pole may be selected or adjusted initially, the AC coupling pole may be set at 610 in order to optimize phase shift and amplitude reduction at low frequency data patterns. However, as needed, the AC coupling pole may be moved to position 612 to provide a faster recovery time. If needed, the AC coupling pole may be moved to position 614 or position 616 depending upon how hard the amplifier has been saturated.

In summary, providing a programmable AC coupling pole prior to the stages of amplification which would saturate during a disturbance to the MR head operating point allows the user to choose an AC coupling pole which best fits the data rate and the application. With a programmable AC coupling pole, the pole location can be chosen for each data band on a file to achieve the fastest recovery from a baseline shift without degrading the normal channel performance. Further, the low frequency pole may be moved higher during a data recovery procedure to attempt to reread the data.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for improving data recovery for a magneto-resistive head, comprising:
    a circuit path carrying digital data signals read from a recording media by a magnetic head;
    an amplifier, coupled to the circuit path, for amplifying the digital data signals;
    a recovery time setting means, coupled to the amplifier, the recovery time setting means having an programmable recovery time constant associated therewith, the recovery time constant being adjusted to set a recovery time for the amplifier to provide readable data signals representing the digital data signals read by the magnetic head after a disturbance to the magnetic head; and
    a digital controller, coupled to the recovery time setting means, for adjusting the recovery time setting means to change the recovery time constants in response to a disturbance to the magnetic head;
    wherein the amplifier comprises a data channel amplifier providing an input signal to channel electronics, the recovery time setting means comprises a programmable RC filter and the recovery time constant comprises an AC coupling pole for the RC filter, the AC coupling pole being selected to set a recovery time for the data channel amplifier.

2. The apparatus of claim 1 further comprising a data channel module, the data channel module being coupled to the recovery time setting means and the preamplifier, the data channel module providing further processing of the digital data signals.

3. The apparatus of claim 1 wherein the recovery time setting means is disposed at the output of a magnetic head preamplifier.

4. The apparatus of claim 1 wherein the data path comprises a differential signal path and the programmable RC filter comprises a capacitor for each leg in the differential signal path and a selectable array of resistors.

5. The apparatus of claim 4 wherein the selection of the resistors sets the AC coupling pole that controls the recovery time for the data channel amplifier.

6. The apparatus of claim 5 wherein a selection of greater resistance reduces the recovery time for the data channel amplifier.

7. The apparatus of claim 6 wherein a decrease in the resistance in the programmable RC filter raises the AC coupling pole of the data channel amplifier.

8. The apparatus of claim 1 wherein the digital controller comprises a logic interface coupled to the programmable RC filter, the logic interface receiving commands from a file interface processor for adjusting the recovery time of the data channel amplifier.

9. The apparatus of claim 8 wherein the logic interface comprises a digital-to-analog converter.

10. An apparatus for improving data recovery for a magneto-resistive head, comprising:
    a circuit path carrying digital data signals read from a recording media by a magnetic head;
    a data channel amplifier, coupled to the circuit path, for amplifying the digital data signals and providing an output signal to channel electronics;
    a programmable RC filter, coupled to the data channel amplifier, the programmable RC filter having an adjustable AC coupling pole associated therewith, the adjustable AC coupling pole being adjusted to set a recovery time for the data channel amplifier to provide readable data signals representing the digital data signals read by the magnetic head after a disturbance to the magnetic head; and
    a digital controller, coupled to the programmable RC filter, for adjusting the programmable RC filter to change the recovery time constants in response to a disturbance to the magnetic head.

11. The apparatus of claim 10 wherein the programmable RC filter is further coupled to the output of a magnetic head preamplifier.

12. The apparatus of claim 10 wherein the data path comprises a differential signal path and the programmable RC filter comprises a capacitor for each leg in the differential signal path and a selectable array of resistors coupled across the differential signal path.

13. The apparatus of claim 12 wherein the selection of the resistors sets the AC coupling pole that controls the recovery time for the data channel amplifier.

14. The apparatus of claim 13 wherein a selection of greater resistance reduces the recovery time for the data channel amplifier.

15. The apparatus of claim 10 wherein the digital controller comprises a logic interface coupled to the programmable RC filter, the logic interface receiving commands from a file interface processor for adjusting the recovery time of the data channel amplifier.

16. The apparatus of claim 15 wherein the logic interface comprises a digital-to-analog converter.

17. The apparatus of claim 10 wherein an decrease in the resistance in the programmable RC filter raises the AC coupling pole of the data channel amplifier.

18. A method for improving data recovery for a magneto-resistive head, comprising the steps of:

reading data from a recording media;

providing digital data signals in response to reading the data from the recording media;

amplifying the digital data signals via a data channel amplifier, the data channel amplifier providing an input signal to channel electronics;

detecting a disturbance with the magnetic head; and programming a recovery time constant for the data channel amplifier by adjusting an AC coupling pole by selecting a resistance of a programmable RC filter to reduce the recovery time for the amplifier.

19. The method of claim 18 wherein the recovery time constant comprises a selectable gain for the amplifier.

20. The method of claim 19 wherein the step of programming the gain comprises the step of adjusting the low frequency pole of the amplifier.

21. The method of claim 19 wherein the step of programming the gain further comprises the step of decreasing the bandwidth of the amplifier.

22. The method of claim 19 wherein the gain comprises a baseline restore loop gain.

23. The apparatus of claim 22 wherein the step of programming the gain of the amplifier comprises the step of reducing the recovery time for the amplifier.

24. The method claim 18 wherein the step of programming the recovery time constant further comprises the steps of receiving commands from a file interface processor.

25. The method of claim 18 wherein the step of programming the recovery time constant further comprises the step of selecting an AC coupling pole to set a recovery time for the amplifier.

26. The method of claim 18 wherein the selecting a resistance to reduce the recovery time for the amplifier further comprises the step of decreasing the bandwidth of the amplifier.

27. A disk drive, comprising:

a housing;

at least one disk recording media mounted in said housing for rotation about an axis and having at least one disk surface for storing data;

a magnetic head mounted for movement across said disk surface for reading data on said disk surface;

a circuit path, coupled to the magnetic head, for carrying digital data signals read from the disk recording media by the magnetic head;

an amplifier, coupled to the circuit path, for amplifying the digital data signals;

a recovery time setting means, coupled to the amplifier, the recovery time setting means having an programmable recovery time constant associated therewith, the recovery time constant being adjusted to set a recovery time for the amplifier to provide readable data signals representing the digital data signals read by the magnetic head after a disturbance to the magnetic head; and a digital controller, coupled to the recovery time setting means, for adjusting the recovery time setting means to change the recovery time constants in response to a disturbance to the magnetic head;

wherein the amplifier comprises a data channel amplifier providing an output signal to channel electronics and wherein the recovery time setting means comprises a programmable RC filter, the recovery time constant comprising an AC coupling pole for the RC filter, the AC coupling pole being selected to set a recovery time for the data channel amplifier.

28. The apparatus of claim 27 further comprising a data channel module, the data channel module being coupled to the recovery time setting means and the preamplifier, the data channel module providing further processing of the digital data signals.

29. The apparatus of claim 27 wherein the recovery time setting means is disposed at the output of a magnetic head preamplifier.

30. The apparatus of claim 27 wherein the data path comprises a differential signal path and the programmable RC filter comprises a capacitor for each leg in the differential signal path and a selectable array of resistors.

31. The apparatus of claim 30 wherein the selection of the resistors sets the AC coupling pole that controls the recovery time for the data channel amplifier.

32. The apparatus of claim 31 wherein a selection of greater resistance reduces the recovery time for the data channel amplifier.

33. The apparatus of claim 32 wherein an decrease in the resistance in the programmable RC filter raises the AC coupling pole of the data channel amplifier.

34. The apparatus of claim 27 wherein the digital controller comprises a logic interface coupled to the programmable RC filter, the logic interface receiving commands from a file interface processor for adjusting the recovery time of the data channel amplifier.

35. The apparatus of claim 34 wherein the logic interface comprises a digital-to-analog converter.

* * * * *